United States Patent [19]

Beal

[11] B 3,916,031
[45] Oct. 28, 1975

[54] FEED ADDITIVE FOR POULTRY FROM SOYBEAN OIL SOAPSTOCKS

[75] Inventor: Robert E. Beal, Elmwood, Ill.

[73] Assignee: The United States of America as represented by the Secretary of Agriculture, Washington, D.C.

[22] Filed: Jan. 31, 1973

[21] Appl. No.: 328,200

[44] Published under the Trial Voluntary Protest Program on January 28, 1975 as document no. B 328,200.

[52] U.S. Cl. ............... 426/540; 426/601; 426/648; 426/807
[51] Int. Cl.² .......................................... A23K 1/00
[58] Field of Search .......... 426/148, 177, 229, 369, 426/489, 807, 218; 260/412.3

[56] References Cited
UNITED STATES PATENTS

| | | | |
|---|---|---|---|
| 2,789,120 | 4/1957 | Cavanagh | 260/412.3 |
| 2,916,385 | 12/1959 | Bauernfeind et al. | 426/177 |
| 2,924,525 | 2/1960 | Kruse et al. | 424/343 |
| 3,523,138 | 8/1970 | Grant | 426/807 |

FOREIGN PATENTS OR APPLICATIONS

| | | | |
|---|---|---|---|
| 817,834 | 8/1959 | United Kingdom | 99/2 OE |

Primary Examiner—A. Louis Monacell
Assistant Examiner—Curtis P. Ribando
Attorney, Agent, or Firm—M. Howard Silverstein; Max D. Hensley; David G. McConnell

[57] ABSTRACT

A poultry feed additive is described which equals the feed efficiency of commercial feed fats and which gives significantly better shank pigmentation. The process by which it is obtained has the added advantage of eliminating the pollution factor of a vegetable oil refining effluent.

1 Claim, No Drawings

FEED ADDITIVE FOR POULTRY FROM SOYBEAN OIL SOAPSTOCKS

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

The invention relates to a soybean oil refining by-product useful as an additive for poultry feeds. More specifically, it relates to dried, neutralized soapstocks.

Alkali-refining of crude vegetable oil is generally defined as the removal of undesirable constituents of the oil by treatment with an aqueous solution of sodium hydroxide. The highly alkaline effluent of this process, which contains the soaps of free fatty acids, phosphatides, traces of metal ions, and other minor constituents, is called "soapstock."

Disposition of soapstock has become a problem with many refineries because of increased restrictions on environmental pollution. Acidulation of soapstock, widely used to convert it to salable fatty acids by boiling with excess mineral acid, produces a substantial mount of acidic wastewater containing biodegradable material, *Bailey's Industrial Oil and Fat Products*, Third Edition (ed. D. Swern), Interscience Publishers, New York, 1964, pp. 762–765. Disposal of the waste is increasingly difficult and costly. Various other methods of handling soapstock are used or have been proposed. Addition of soapstock directly to oilseed meal is practical under certain conditions. However, the difficulty of handling wet soapstock, preventing microbial spoilage, and avoiding shipping costs often precludes such disposition.

It is disclosed in U.S. Pat. Nos. 2,924,525 and 2,929,714 that unacidulated soapstock contains a significant quantity of xanthophyll which is useful to give chickens the yellow pigmentation desired by consumers. However, it is also disclosed that it is necessary to maintain a high degree of alkalinity in the dried product to prevent deterioration of the xanthophyll during storage. Xanthophyll and carotene are destroyed by acidulation. Removing the water from this alkaline product also creates a pollution problem.

Contrary to the prior art, which teaches the xanthophyll must be kept in an alkaline medium, I have discovered that soapstocks from the alkali-refining of crude nondegummed soybean oil can be neutralized to a pH of about 7 with mineral acids with no significant loss of xanthophyll. The neutralized soapstocks can then be dried to a moisture level of from 0 to 20 percent by weight to form a waxy solid product which can be stored at room temperature (25°C.) with no significant microbial spoilage or deterioration of xanthophyll.

When neutralized soapstocks are prepared according to the invention, the only effluent from the process is evaporated water.

DETAILED DESCRIPTION OF THE INVENTION

Soapstock from the alkali-refining of crude soybean oils, preferably nondegummed, is neutralized with a sufficient quantity of mineral acid to decrease the pH of an aqueous dispersion of the soapstock to 6.9 to 7.1. Neutralization is conducted preferably at temperatures of 25° to 50°C. so that undesirable side reactions do not occur in localized points in the mixture, until the mineral acid (e.g., $H_2SO_4$, HCl, $HNO_3$) has completely reacted with free alkali and soaps in the soapstock. By conducting neutralization of soapstock from crude nondegummed soybean oil, I have found that not only xanthophyll but also carotene are retained in the soapstock, and the value of the product for use as a feed additive is therefore greater. Neutralization can readily be conducted in a conventional ribbon blender by introducing the soapstock to the blender and while it is then being mixed, gradually adding the required amount of acid until a dispersion of about 10 g. of the soapstock in 50 ml. of distilled water has a pH of between 6.9 and 7.1. Subsequent removal of water can then be accomplished in a suitable steam-heated evaporator and preferably under vacuum. One type of evaporator which has been found suitable is the scraped film evaporator wherein the neutralized soapstock is spread in a thin film over the heated surface and as it flow downward over the surface. Moisture is rapidly removed under the action of the heat and the vacuum applied to the evaporator. The neutral "dry" product, which is a viscous liquid at temperatures above 45°C., then flows by gravity to an evacuated receiver where it can be collected and later transferred to drums or tanks for storage or for sale. To minimize darkening of the product, it is preferred to use minimum steam temperature and steam pressure of not more than about 5 p.s.i.g. in the evaporator steam chamber during drying. It is also preferred to use a vacuum in excess of 20 in. of mercury to facilitate drying and minimize time of heating. Removal of water from neutralized soapstock has also been satisfactorily carried out in a natural circulation evaporator with indirect steam heating at 5 p.s.i. and at a vacuum of 20 to 26 in. of mercury on the evaporator condensate receiver.

It is therefore apparent that the only effluent or waste discharge from the process of this invention is distilled water evaporated from the neutralized soapstock and which contains no biodegradable material.

Unlike the previous process of drum drying, the neutralization-dehydration process of the present invention produces no dusty material to contribute to air pollution. Instead, it gives a soft, waxy product which liquifies when heated slightly and is therefore an ideal feed additive for helping to alleviate the dust problem of poultry and animal feeds as well as increasing the fat and pigment content of the feed.

Unexpectedly, when soapstocks neutralized according to the invention were added to a standard broiler ration, the feed efficiency and rate of gain of chickens equaled that obtained with a commercial feed fat added to the broiler ration at the same weight percent, even though the neutralilzed soapstock had a lower total fatty acid content. The soapstock products, which contained 200–300 p.p.m. xanthophyll, gave significantly better shank pigmentation than a standard commercial fat, which contained only 3 p.p.m.

The following examples are intended only to further illustrate the invention and should not be construed as limiting the scope of the claims.

EXAMPLES 1–2

Soapstock (42.6 lb.), produced by alkali-refining crude, nondegummed soybean oil in a commercial refining plant, was placed in a 1-cu.-ft. stainless-steel, batch-ribbon blender and thoroughly mixed. A 10-g. aliquot of the blended lot was dispersed in 50 ml. distilled water; 1 percent sulfuric acid was slowly added from a burette with rapid stirring until a pH of 7.0 was reached and persisted for more than 1 min. From this titration a calculated amount (5.25 lb. of 25 percent sulfuric acid) was slowly added to the soapstock while it was being mixed in the ribbon blender. Mixing was continued for about 15 min. after addition of the acid and until a 10-g. sample dispersed in 50 ml. of distilled water gave a pH of 6.9.

The neutralized soapstock was dried batchwise by drawing it into a small steam-heated, natural-circulation evaporator under a 22-in. vacuum and heating cautiously because of a tendency to foam. As evaporation proceeded, steam pressure reached 10 p.s.i.; when circulation stopped, the batch was withdrawn into a suitable container where it solidified on cooling to room temperature to a waxy solid.

Moisture was determined by drying a sample to constant weight in a rotating flask evaporator while heating the flask in a water bath at 90° to 95°C. and an absolute pressure of 0.5 mm. of mercury. Free fatty acids were determined by AOCS Official Method Ac 5-41 and unsaponifiable material by Method Da 10-42.

Total fatty acids (free and combined) were determined by the GLC method of Black et al., Cereal Chem. 44: 152–159 (1967).

Sodium was determined by an atomic adsorption method similar to that described by List et al., JAOCS 48: 438–441 (1971). An oil-soluble sodium standard was obtained from the National Bureau of Standards. The instrument was a Techtron AA 120 with a sodium lamp.

Carotene and xanthophyll were determined by Official AOAC Method 39.019–31.022.

Phosphorous was determined by the method of Truog and Meyer, Ind. Eng. Chem. Anal. Ed. 1: 136–139 (1929).

Fatty acid composition was determined by preparing methyl esters by the AOCS Tentative Method Ce 2-66 (rev. 1969) and analyzing by GLC, AOCS Tentative Method Ce 1-62 (rev. 1970). The results of the above analyses are shown in Table 1.

EXAMPLE 3

Soapstock from alkali-refined crude, nondegummed soybean oil was neutralized in the same manner as described in Example 1 and dried continuously by a single pass through a steam-heated, thin-film (scraped film) evaporator operated under an absolute pressure of about 5 mm. of mercury with steam at 20 p.s.i. in the jacket. Compared with the first two lots, the product was visibly darker brown, apparently as a result of the higher temperature (steam pressure) used. The product was then analyzed as described in Example 1, see Table 1.

EXAMPLES 4–5

To show that neutralization does not decrease the carotene and xanthophyll content of soapstock, in Example 4 an aliquot (50.6 g.) of soapstock from the alkali-refining of crude, degummed soybean oil was dehydrated without neutralization in a laboratory-size rotary evaporator under a vacuum of 0.5 mm. mercury absolute at a temperature of 90°C.; yield, 35.6 g.

In Example 5 41.3 g. of the soapstock described above was dispersed in about 200 ml. of distilled water and neutralized to pH 7.0 with dilute sulfuric acid and dried as described in Example 1; yield, 29.8 g.

The products of Examples 4 and 5 were analyzed as described in Example 1, Table 1. The lower amounts of chlorophyll and carotene in the products of Examples 4 and 5 as compared to those from Examples 1, 2, and 3 is believed due to the fact that the starting material of Examples 4 and 5 was obtained from the alkali-refining of soybean oil which had been previously degummed. However, these products contained 10 times the amounts of chlorophyll and carotene as did a commercial feed additive, see Table 1.

EXAMPLE 6

Broiler feeding studies were conducted with straight-run day-old broiler-type chicks. Twenty chicks were randomly assigned to each of four replicate pens and fed a chick grower mash containing 4 percent of commercial feed fat as a control (Diet A, Table 2). A second series of four replicated pens of 20 chicks each were fed a similar diet containing 4 percent of the neu- Table 1

| Component | Neutralized, dried Soapstock composition, wt.% Example No. | | | | | Commercial feed fat |
|---|---|---|---|---|---|---|
| | 1 | 2 | 3 | 4 | 5 | |
| Total fatty acids | 71.0 | 64.0 | 54.0 | — | — | 97.3 |
| Free fatty acids | 34.0 | 28.3 | 27.1 | — | — | 41.6 |
| Moisture | 4.6 | 4.4 | 5.7 | 0.0 | 0.0 | 1.6 |
| Unsaponifiable | 2.0 | 2.0 | 2.1 | — | — | 0.046 |
| Phosphorous | — | 1.04 | 0.80 | — | 1.66 | 0.0019 |
| Sodium | 1.8 | 1.6 | 4.5 | — | — | 0.0 |
| Carotene | 350 | 575 | 229 | 78.0 | 89.0 | 4.0 |
| Xanthophyll | 202 | 313 | 231 | 40.0 | 38.0 | 3.0 |
| Fatty acid composition: | | | | | | |
| $C_{14}$ and lower | — | — | — | | | 10.1 |
| $C_{16}$ | 16.7 | 17.6 | 17.3 | | | 25.8 |
| $C_{18-0}$, stearic | 4.6 | 4.2 | 4.4 | | | 14.6 |
| $C_{18-1}$, oleic | 15.9 | 15.6 | 15.7 | | | 37.0 |
| $C_{18-2}$, linoleic | 55.7 | 55.7 | 55.4 | | | 11.2 |
| $C_{18-3}$, linolenic | 7.1 | 6.9 | 7.2 | | | 1.3 |

Example 2 is a repeat of Example 1, except that the neutralization was accomplished with concentrated hydrochloric acid instead of sulfuric.

tralized, dried soapstock from Example 1 (Diet B, Table 2). The studies were terminated at 6 weeks when individual body weights and sexes were determined. At the end of each study, 30 males and 30 females were selected at random from each treatment for pigmentation measurements. Two operators, working independently of each other, obtained visual scores on the shank pigmentation of each bird using a Roche Yolk Color Fan. Readings were taken at approximately the same position on the shank (anterior metatarsus) skin. The data were analyzed statistically using the standard F-test, J. C. R. Li Statistical Inference, Edward Bros., Inc., Ann Arbor, Michigan, 1964. The growth data were analyzed by a balanced error term for the F-ratio test for main effects, Table 3.

EXAMPLE 7

Example 6 was repeated using the product of Example 2. The results are shown in Table 3.

Table 3

| Treatment | Average weights at 6 weeks (g). | | Feed conversion | | Shank pigmentation scores (average) | |
|---|---|---|---|---|---|---|
| | Example 6 | Example 7 | Example 6 | Example 7 | Example 6 | Example 7 |
| Diet A | 1,293 | 1,331 | 1.86 | 1.87 | 5.57 | 4.1 |
| Diet B | 1,309 | 1,305 | 1.92 | 1.90 | 7.65 | 6.0 |

1 total feed consumption of the four replicate groups/total weight gain of groups (F/G).

Table 2

| Ingredient | Diet A | Diet B |
|---|---|---|
| Gr. yellow corn | 55.9 | 55.9 |
| Soybean oil meal, 50% | 23.0 | 23.0 |
| Mendaden fish meal, 60% | 5.2 | 5.2 |
| Meat scraps, 48% | 5.0 | 5.0 |
| Commerical feed fat | 4.0 | — |
| Neutralized, dried soapstock, from Example 1 | — | 4.0 |
| Corn gluten meal, 60% | 2.5 | 2.5 |
| Alfalfa meal, 17% | 2.0 | 2.0 |
| Dyna-Fos 20–24% Ca, 18.5% P | 0.6 | 0.6 |
| Solulac | 0.5 | 0.5 |
| Limestone flour | 0.4 | 0.4 |
| Salt, plain | 0.3 | 0.3 |
| Choline supplement-25[1] | 0.3 | 0.3 |
| Vitamin-trace mineral mix[2] | 0.25 | 0.25 |
| Vitamin E supplement[3] | 0.05 | 0.05 |

[1] Containing 98,415 mg./lb.
[2] Commercial vitamin-trace mineral mix supplying bacitracin (5 mg./kg. of diet).
[3] Containing 20,000 I.U./lb.

I claim:

1. A feed additive for poultry feed comprising the acid neutralized soapstocks from alkali refined non-degummed soybean oil having the following composition:

| Component | Weight percent |
|---|---|
| Total fatty acids | 50 to 70 |
| Free fatty acids | 25 to 35 |
| Unsaponifiables | 2 |
| Phosphorous | 1 |
| Sodium | 1 to 5 |
| Carotene | 0.02 to 0.06 |
| Xanthophyll | 0.02 to 0.03 |
| Moisture | 4 to 20; | said additive being characterized as being a waxy solid at a temperature of 25°C., and having a pH of 6.9 to 7.1.

* * * * *